United States Patent
Sawaki et al.

(10) Patent No.: US 6,997,984 B2
(45) Date of Patent: Feb. 14, 2006

(54) CEMENT ADMIXTURE

(75) Inventors: Daisuke Sawaki, Chiba (JP); Shuuichi Harasawa, Chiba (JP); Kenichi Honma, Chiba (JP); Makihiko Ichikawa, Chiba (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 10/507,682

(22) PCT Filed: Mar. 19, 2003

(86) PCT No.: PCT/JP03/03315

§ 371 (c)(1),
(2), (4) Date: Sep. 22, 2004

(87) PCT Pub. No.: WO03/080532

PCT Pub. Date: Oct. 2, 2003

(65) Prior Publication Data

US 2005/0115465 A1 Jun. 2, 2005

(30) Foreign Application Priority Data

Mar. 22, 2002 (JP) .............................. 2002-081004

(51) Int. Cl.
*C04B 22/08* (2006.01)
*C04B 7/24* (2006.01)

(52) U.S. Cl. .................. 106/692; 106/638; 106/693; 106/695; 106/738; 106/819

(58) Field of Classification Search ............... 106/638, 106/692, 693, 695, 738, 819
See application file for complete search history.

(56) References Cited

U.S. PATENT DOCUMENTS

| | | | | |
|---|---|---|---|---|
| 4,174,974 A | * | 11/1979 | Fondriest | 106/735 |
| 4,329,179 A | * | 5/1982 | Kutta | 588/252 |
| 5,356,472 A | * | 10/1994 | Odler | 106/734 |
| 5,843,222 A | * | 12/1998 | Miller et al. | 106/608 |
| 6,419,738 B1 | * | 7/2002 | Classen et al. | 106/692 |
| 2004/0216644 A1 | * | 11/2004 | Morioka et al. | 106/789 |
| 2004/0231569 A1 | * | 11/2004 | Stroup et al. | 106/714 |

FOREIGN PATENT DOCUMENTS

| | | |
|---|---|---|
| JP | 58-122081 | 7/1983 |
| JP | 08-053835 | 2/1996 |
| JP | 10-230237 | 9/1998 |
| JP | 11-240743 A * | 9/1999 |

* cited by examiner

*Primary Examiner*—Anthony J. Green
(74) *Attorney, Agent, or Firm*—Oblon, Spivak, McClelland, Maier & Neustadt, P.C.

(57) ABSTRACT

A burned product containing 100 parts by weight of $C_2S$, 10 to 100 parts by weight of $C_2AS$, and 20 parts by weight or less of $C_3A$; a cement admixture prepared by grinding the burned product; and a cement containing 100 parts by weight of ground portland cement clinker and 5 to 100 parts by weight of a ground product of the burned product.

19 Claims, No Drawings

CEMENT ADMIXTURE

TECHNICAL FIELD

The present invention relates to a cement admixture which lowers the heat of hydration of cement, and imparts excellent fluidity to cement.

BACKGROUND ART

Currently, in the cement industry, industrial waste and non-industrial waste are recycled as a raw material for producing cement (see, for example, Japanese Patent Application Laid-Open (kokai) Nos. 56-120552 and 2000-281395). However, when such waste is used in a large amount as a raw material for producing cement, the content of $C_3A$ present in the cement increases, and often leads to the problem that the heat of hydration of the cement increases. Moreover, when mortar or concrete is produced through use of such a cement and an admixture, the slump or mortar flow (i.e., the fluidity of mortar) shrink and cause flow loss and slump loss to increase.

Accordingly, an object of the present invention is to provide a cement admixture which lowers the heat of hydration of cement, and imparts excellent fluidity to cement.

DISCLOSURE OF THE INVENTION

Under the above circumstances, the present inventors have carried out careful studies, and have found that when a burned product of a mixture containing $C_2S(2CaO.SiO_2)$ and $C_2AS(2CaO.Al_2O_3.SiO_2)$ at specified proportions, with $C_3A(3CaO.Al_2O_3)$ content being 20 or less parts by weight, is ground and admixed with portland cement clinker, the resultant cement exhibits low heat of hydration and good fluidity, thereby leading to completion of the present invention.

Accordingly, the present invention provides a sintered product containing 100 parts by weight of $C_2S$, 10 to 100 parts by weight of $C_2AS$, and 20 or less parts by weight of $C_3A$; and a cement admixture prepared by grinding the burned product.

The present invention also provides a cement which contains 100 parts by weight of grinding portland cement clinker and 5 to 100 parts by weight of a ground product of the aforementioned burned product.

BEST MODES FOR CARRYING OUT THE INVENTION

The burned product of the present invention contains $C_2S$ and $C_2AS$, wherein $C_2S$ accounts for 100 parts by weight and $C_2AS$ accounts for 10 to 100 parts by weight, preferably 20 to 90 parts by weight. When $C_2AS$ content is lower than 10 parts by weight, the amount of free lime (i.e., unreacted CaO) is hard to decrease even with elevated burning temperature during burning, thus hampering successful burning. Moreover, the formed $C_2S$ is highly likely to be $\gamma$-$C_2S$ having no hydration activity and thus may greatly deteriorate the strength of the cement. On the other hand, a $C_2AS$ content exceeding 100 parts by weight increases the volume of melt at high temperature, narrowing the burning temperature range. In addition, because $C_2S$ content is low, not only the initial strength but also the long-term strength of the cement deteriorates.

In the burned product of the present invention, the $C_3A$ content with respect to 100 parts by weight of $C_2S$ is 20 or less parts by weight, preferably 10 or less parts by weight. When the $C_3A$ content exceeds 20 parts by weight, heat of hydration of cement increases and fluidity deteriorates.

A burned product satisfying the above compositional requirement may be produced by burning one or more materials selected, for example, from among industrial waste, non-industrial waste, and construction waste soil. Examples of industrial waste include, but are not limited to, coal ash; various types of sludge, such as ready-mixed concrete sludge, sewage sludge, water purifying sludge, construction sludge, and iron-making sludge; and other types of waste such as soil discharged from drilling, ashes from incinerators, molding sand, rock wool, glass waste, secondary ash from blast furnace, construction waste, and concrete waste. Examples of non-industrial waste include dry powder of sewage sludge, ashes from municipal refuse incinerators, and seashells. Also, examples of construction waste soil include soil and spoil produced from construction sites or demolishing sites, and discarded soil.

Depending on the compositions of the raw materials used for producing the burned product; in particular, in some cases where one or more materials selected from among the aforementioned industrial waste, non-industrial waste, and construction waste soil (hereinafter any of these wastes serving as a raw material will be collectively called "raw material waste") are used as raw materials, $C_4AF$ ($4CaO.Al_2O_3.Fe_2O_3$) may be formed. However, in the burned product of the present invention, a portion of $C_2AS$, preferably 70 or less wt. % of the weight of $C_2AS$ may be replaced by $C_4AF$. Replacement by $C_4AF$ beyond this range will narrow the temperature range for successful burning, thus making production control difficult.

The mineral composition of the burned product of the present invention can be calculated from the CaO content, $SiO_2$ content (wt. %), $Al_2O_3$ content (wt. %), and $Fe_2O_3$ content (wt. %) of the raw materials used, by the following equations.

$C_4AF = 3.04 \times Fe_2O_3$ $C_3A = 1.61 \times CaO - 3.00 \times SiO_2 - 2.26 \times Fe_2O_3$ $C_2AS = -1.63 \times CaO + 3.04 \times SiO_2 + 2.69 \times Al_2O_3 + 0.57 \times Fe_2O_3$ $C_2S = 1.02 \times CaO + 0.95 \times SiO_2 - 1.69 \times Al_2O_3 - 0.36 \times Fe_2O_3$ Accordingly, when the raw material waste contains an insufficient amount of, for example, calcium, the shortage amount may be supplemented by the addition of limestone or a similar material. The proportion of the supplemental material is appropriately determined depending on the composition of the raw material waste, so that the composition of the resultant burned product falls within the scope of the present invention.

The burning temperature upon burning of the above raw materials is preferably 1,000 to 1,350° C., more preferably 1,200 to 1,330° C., for attaining an excellent melt phase during the burning step.

No particular limitations are imposed on the sintering apparatus. For example, a rotary kiln may be used. When burning is carried out by use of a rotary kiln, fuel substitute wastes, such as waste oils, scrap tire, and waste plastics may be used.

By such burning as described above, $C_2AS$ is generated and the $C_3A$ content becomes less than that obtained according to the Bogue's calculation, so that a burned product having the composition defined by the present invention can be obtained.

The cement admixture of the present invention is obtained by grinding the thus-obtained burned product. Gypsum may be added to a ground product of the burned product, in an amount of 1 to 6 parts by weight (on an $SO_3$ basis) with respect to 100 parts by weight.

No particular limitation is imposed on the grinding method. For example, a ball mill or a similar mill may be used in combination with a conventional grinding method. The resultant ground product of the burned product preferably has a Blaine specific surface area of 2,500 to 5,000 $cm^2/g$, from the viewpoints of reduced bleeding, good fluidity, and ensured strength of mortar or concrete.

The cement of the present invention may be obtained by mixing 5 to 100 parts by weight of a ground product of the aforementioned burned product with 100 parts by weight of ground portland cement clinker. The mixing ratio between the two may differ depending on the type of cement. For example, when normal portland cement is of interest, the amount of the ground product to be mixed is preferably 5 to 50 parts by weight, more preferably 10 to 40 parts by weight, whereas when low-heat cement is of interest, the amount of the ground product to be mixed is preferably 50 to 100 parts by weight, more preferably 66 to 100 parts by weight.

The cement of the present invention may contain gypsum. When gypsum is incorporated, its amount (as calculated on a total $SO_3$ basis) is preferably 1.5 to 5 wt. %, more preferably 2 to 3.5 wt. %, most preferably 2.5 to 3 wt. %, of the cement, for ensuring typical coagulation properties. No particular limitations are imposed on the gypsum, and there may be used dihydrate gypsum, α- or β-hemihydrate gypsum, type-III anhydrous gypsum, or type-II anhydrous gypsum, among other gypsums, and these may be used singly or in aombination of two or more species.

The cement of the present invention may be produced by mixing the aforementioned components. No particular limitations are imposed on the method for mixing. For example, cement components including, e.g., portland cement clinker, the burned product, and gypsum, are mixed and then ground; or alternatively, respective components may be ground and then mixed together. Further alternatively, a cement admixture prepared by grinding the burned product and gypsum may be mixed with ground cement clinker, whereby a cement of the present invention can be obtained. The resultant cement preferably has a Blaine specific surface area of 2,500 to 4,500 $cm^2/g$, from the viewpoints of reduced bleeding, good fluidity, and ensured strength of mortar or concrete.

EXAMPLES

The present invention will next be described in more detail by way of examples, which should not be construed as limiting the invention thereto.

Example 1

The burned products shown in Table 1 were prepared.

Briefly, the raw materials; i.e., limestone, ready-mixed concrete sludge, sewage sludge, and construction waste soil, were mixed at the proportions indicated in Table 1, and the resultant mixtures were burned in a small-scale rotary kiln at their corresponding temperatures shown in Table 1, so that a free lime content of 1% or less was attained. The chemical composition of each of the raw materials is shown in Table 2.

TABLE 1

| | Raw materials employed (parts by weight) | | | | Burning | | Mineral composition (parts by weight) | | | |
|---|---|---|---|---|---|---|---|---|---|---|
| No. | lime-stone | Ready-mixed sludge | Sewage sludge | Waste soil[#] | temp. (° C.) | f-CaO | $C_2S$ | $C_2AS$ | $C_4AF$ | $C_3A$ |
| 1 | 100 | | 100 | | 1270 | 0.6 | 100 | 51 | 37 | 0 |
| 2 | 100 | | 90 | | 1300 | 0.4 | 100 | 33 | 34 | 12 |
| 3 | 100 | | 80 | | 1320 | 0.5 | 100 | 15 | 30 | 26 |
| 4 | | 100 | | | 1250 | 0.7 | 100 | 11 | 13 | 15 |
| 5 | | 100 | 10 | | 1250 | 0.7 | 100 | 29 | 5 | 17 |
| 6 | 100 | | | 50 | 1330 | 1.0 | 100 | 13 | 19 | 3 |
| 7 | Industrial material | | | | 1450 | 0.9 | 100 | 5 | 0 | 5 |
| 8 | Industrial material | | | | 1210 | 0.3 | 100 | 80 | 25 | 15 |

[#]Construction waste soil

TABLE 2

| | Ig. loss | $SiO_2$ | $Al_2O_3$ | $Fe_2O_3$ | CaO | $Na_2O$ | $P_2O_5$ | $SO_3$ | MgO | $K_2O$ |
|---|---|---|---|---|---|---|---|---|---|---|
| limestone | 43.9 | 0.03 | 0.01 | 0.01 | 55.3 | 0.00 | 0.10 | 0.00 | 0.56 | 0.00 |
| Ready-mixed sludge | 0.0 | 24.88 | 7.60 | 2.96 | 56.69 | 2.76 | 2.02 | 0.21 | 0.56 | 0.00 |
| Sewage sludge | 15.0 | 29.97 | 16.112 | 8.044 | 10.91 | 4.188 | 10.7 | 0.42 | 0.01 | 0.02 |
| Waste soil[#] | 13.3 | 52.7 | 13.8 | 8.7 | 2.5 | 1.5 | 0.5 | 2.7 | 1.2 | 1.94 |

The burned product Nos. 7 and 8 were prepared by use of an industrial material. In the case of No. 7 product, in which $C_2AS$ and $C_4AF$ were contained only in a total amount of 5 parts by weight with respect to 100 parts by weight of $C_2S$, the free lime content became 1% or less at a burning temperature of 1,450° C. However, during cooling, dusting of the burned product occurred, permitting generation of γ-$C_2S$, which does not provide strength. On the other hand, in the case of No. 8 product, in which $C_2AS$ and $C_4AF$ were contained in a total amount of 105 parts by weight, granulation began to occur at 1,230° C., and a free lime content became 0.5% or less at 1,250° C. However, when the burning temperature is elevated further, the volume of liquefied matter extremely increased and melting occurred and thus, sintering could not be performed successfully.

Example 2

The clinkers used were normal portland cement clinkers having the compositions shown in Table 3. The gypsum employed was a dihydrate gypsum (product of Sumitomo Metal Industries, Ltd.). The clinker and gypsum were mixed with each of the burned products at the proportions shown in Table 4, followed by simultaneous grinding in a batch-type ball mill, so as to attain a Blaine specific surface area of 3,250±50 $cm^2$/g, whereby a cement product was obtained.

Each of the thus-obtained cement products was evaluated in terms of heat of hydration, mortar flow, and mortar compressive strength. The results are shown in Table 4.

(Evaluation Method)
(1) Heat of hydration:
Heat of hydration was measured according to JIS R 5203.
(2) Mortar flow:
Mortar flow was measured according to JIS R 5201. Specifically, a mortar specimen was prepared by kneading for 5 minutes a mixture produced by incorporating a polycarboxylate-based air entraining and high water reducing agent in an amount of 0.8 wt. % with respect to the weight of cement (W/C=0.35 and S/C=2), and a flow cone specified in JIS R 5201-1997 was employed.
(3) Mortar compressive strength:
The mortar compressive strength values as measured on day 3, day 7, and day 28 were determined according to JIS R 5201.

TABLE 3

| | Raw materials employed (parts by weight) | | | | | Mineral composition (parts by weight) | | | |
|---|---|---|---|---|---|---|---|---|---|
| | Lime-stone | Sewage sludge* | Iron raw material | Silica stone | Burning temp. (° C.) | $C_3S$ | $C_2S$ | $C_4AF$ | $C_3A$ |
| OPC1 | 100 | 29 | 0.5 | 11 | 1500 | 100 | 25 | 16 | 14 |
| OPC2 | 100 | 44 | 0 | 5 | 1450 | 100 | 19 | 24 | 20 |

*The composition is the same as that in Table 2

TABLE 4

| No. | Clinker | $SO_3$*1 | Burned product | Amount of burned product mixed*2 | Heat of hydration (J/g) 7d | Heat of hydration (J/g) 28d | Mortar flow (mm) Immediately after prep. | Mortar flow (mm) 30 min. | Mortar compressive strength (N/mm²) 3d | Mortar compressive strength (N/mm²) 7d | Mortar compressive strength (N/mm²) 28d |
|---|---|---|---|---|---|---|---|---|---|---|---|
| 1 | OPC1 | 2.0 | — | 0 | 335 | 388 | 185 | 155 | 29.1 | 44.2 | 62.5 |
| 2 | OPC2 | 2.0 | — | 0 | 365 | 425 | 100 | 105 | 33.5 | 46.2 | 63.0 |
| 3 | OPC1 | 2.0 | No. 1 | 11 | 320 | 374 | 192 | 162 | 27.5 | 43.5 | 62.1 |
| 4 | OPC1 | 2.0 | No. 1 | 25 | 305 | 350 | 205 | 175 | 26.6 | 41.2 | 61.5 |
| 5 | OPC1 | 2.0 | No. 1 | 42 | 294 | 220 | 221 | 200 | 24.3 | 40.2 | 60.5 |
| 6 | OPC2 | 2.0 | No. 1 | 42 | 330 | 384 | 178 | 145 | 28.6 | 43.9 | 62.1 |
| 7 | OPC1 | 2.0 | No. 1 | 66 | 275 | 332 | 225 | 200 | 20.0 | 35.3 | 59.0 |
| 8 | OPC1 | 2.0 | No. 1 | 100 | 242 | 285 | 226 | 201 | 16.6 | 32.1 | 57.2 |
| 9 | OPC1 | 2.0 | No. 2 | 25 | 317 | 375 | 190 | 165 | 27.5 | 42.8 | 61.2 |
| 10 | OPC1 | 2.0 | No. 3 | 25 | 340 | 395 | 150 | 105 | 28.5 | 43.3 | 63.0 |
| 11 | OPC1 | 2.0 | No. 4 | 25 | 320 | 380 | 188 | 160 | 28.2 | 43.7 | 61.8 |
| 12 | OPC1 | 2.0 | No. 5 | 25 | 321 | 378 | 186 | 162 | 28.0 | 43.0 | 61.9 |
| 13 | OPC1 | 2.0 | No. 6 | 25 | 310 | 360 | 195 | 165 | 27.0 | 42.0 | 62.1 |
| 14 | OPC1 | 2.0 | No. 6 | 42 | 300 | 338 | 210 | 185 | 24.8 | 41.8 | 63.1 |
| 15 | OPC2 | 2.0 | No. 6 | 25 | 345 | 395 | 170 | 140 | 30.5 | 44.2 | 62.8 |
| 16 | OPC1 | 2.0 | No. 7 | 25 | 290 | 340 | 235 | 225 | 19.6 | 35.2 | 52.0 |
| 17 | OPC1 | 2.0 | No. 8 | 25 | 286 | 343 | 235 | 225 | 19.7 | 33.3 | 56.0 |

*1 wt. % with respect to cement
*2 Parts by weight with respect to 100 parts by weight of clinker As is apparent from Table 4, as compared with OPC1 (No. 1), OPC2 (No. 2) exhibits a higher mortar compressive strength; however, heat of hydration is still high and mortar flow is significantly small. OPC2 incorporated a considerable amount of sewage sludge as a raw material, and therefore, the $C_3A$ content and the $C_4AF$ content became high, only to deteriorate fluidity. Accordingly, manufacture of normal cement clinker encounters difficulty when a relatively large amount of sewage sludge is used as a raw material. If use of sewage sludge as a raw material is desired, silica stone and iron raw material must also be incorporated as in the case of OPC1, resulting in a restricted amount of sewage sludge to be used. In contrast, the burned products of the present invention permit effective utilization of a relatively large amount of waste, such as swage sludge; and the burned products can be produced even from waste materials. Moreover, they can be added to conventional cement products without adversely affecting the strength or fluidity of the resultant mortar, concrete, or similar products.

A cement product produced by adding a burned product No. 1 to OPC1 exhibits a decrease in heat of hydration and an increase in mortar flow, as the added amount increases. However, as the added amount increased, strength at an initial material age (day 3, day 7) declined, and when the added amount was 42 parts by weight (No. 5), a relatively small compressive strength, in view of the normal cement standards, was obtained. When 42 parts by weight of a burned product was added to OPC2, the attained heat of hydration, mortar flow, and compressive strength were found to be comparable to those of OPC1.

Moreover, when the amount of a burned product added to OPC1 was 66 parts by weight or 100 parts by weight, the attained compressive strength was found to be relatively small in view of the standards for normal cement, with significantly reduced heat of hydration, and thus meeting the specifications for moderate heat cement or low-heat cement.

In the case where a burned product No. 2, having a high $C_3A$ content as compared with a burned product No. 1, was used to thereby produce a cement product (No. 9), the heat of hydration was lowered as compared with that of OPC1, with an increased mortar flow. However, the effects attained by the burned product No. 2 were insignificant as compared with the burned product No. 1, though reduction in strength observed for the burned product No. 2 was smaller than that observed for the burned product No. 1.

In the case where a burned product No. 3, containing $C_3A$ in an amount higher than 20 parts by weight with respect to 100 parts by weight of $C_2S$, was used to thereby produce a cement product (No. 10), although the compressive strength did not deteriorate, the heat of hydration increased as compared with that of OPC1, with a decreased mortar flow.

Without use of limestone, burned product Nos. 4 and 5 were produced by burning ready-mixed concrete sludge (and sewage sludge) alone. Each of these products was added to OPC1 by an amount of 25 parts by weight. The performance obtained was confirmed to be equivalent to that obtained from burned products produced by the employment of limestone.

In the case where each of burned product Nos. 7 and 8 was added to OPC1 by 25 parts by weight, heat of hydration was significantly reduced and mortar flow increased. However, compressive strength was drastically reduced, and did not recover even on day 28.

Example 3

(1) Production of cement admixture:

Each of the burned product Nos. 1 and 6 obtained from Example 1 was mixed with dihydrate gypsum (product of Sumitomo Metal Industries, Ltd.) at a ratio shown in Table 5, and ground in a batch-type ball mill so as to attain a Blaine specific surface area of $3,250\pm50$ $cm^2/g$, whereby an admixture was obtained.

(2) Production of cement:

To cement No. 1 shown in Table 4 of Example 2, each admixture obtained as described above was mixed at different ratios shown in Table 5, to thereby produce cement products. The resultant cement products were evaluated in a manner similar to that described in Example 2, in terms of heat of hydration, mortar flow, and mortar compressive strength. The results are shown in Table 5.

TABLE 5

| No. | Burned product | $SO_3$*[1] in admixture | Admixture mixing ratio*[2] | Heat of hydration (J/g) | | Mortar flow (mm) | | Mortar compressive strength (N/mm²) | | |
|---|---|---|---|---|---|---|---|---|---|---|
| | | | | 7d | 28d | Immediately after prep. | 30 min. | 3d | 7d | 28d |
| 18 | No. 1 | 2.0 | 11 | 315 | 370 | 193 | 160 | 28.0 | 43.8 | 64.5 |
| 19 | No. 1 | 2.0 | 25 | 303 | 345 | 208 | 174 | 27.0 | 42.2 | 63.0 |
| 20 | No. 1 | 2.0 | 42 | 290 | 315 | 222 | 197 | 25.0 | 42.6 | 62.3 |
| 21 | No. 1 | 2.0 | 66 | 278 | 330 | 228 | 198 | 21.5 | 35.8 | 60.7 |
| 22 | No. 1 | 2.0 | 100 | 245 | 290 | 228 | 198 | 17.0 | 32.5 | 59.1 |
| 23 | No. 6 | 2.0 | 25 | 308 | 355 | 200 | 172 | 26.5 | 41.8 | 63.0 |
| 24 | No. 6 | 2.0 | 42 | 295 | 332 | 218 | 191 | 24.2 | 41.5 | 63.5 |

*[1]Parts by weight with respect to 100 parts by weight of a burned product
*[2]Parts by weight with respect to 100 parts by weight of the cement linker Test Example 1

Cement sample Nos. 1, 4, and 13 shown in Table 4 of Example 2, were used to produce concrete specimens, and the specimens were tested in terms of the slump, air volume, and compressive strength.

The compositions of the respective concrete specimens are shown in Table 6.

The slump, air volume, and compressive strength of each concrete specimen were measured in accordance with the methods specified in JIS A 1101, JIS A 1128, and JIS A 1108, respectively. The size of each specimen is $\Phi 10\times 20$ cm. The results are shown in Table 7.

TABLE 6

| Unit amount (kg/m³) | | | | | |
|---|---|---|---|---|---|
| Cement | Water | Fine aggregate | Coarse aggregate | Water reducing agent | Added AE agent (%) |
| 380 | 190 | 809 | 966 | 0.95 | 1.5 A |

Fine aggregate: Mixture (1:3 by mass) of sea sand and ground sand (F.M.: 2.93)
Coarse aggregate: Ground stone 2005 (F.M.: 6.65)
Water reducing agent: Pozzolith No. 70 (product of NMB) AE agent; 202 A (product of NMB)

TABLE 7

| No. | Clinker | SO$_3$*[1] | Burned product | Added burned product*[2] | Slump (cm) Immediately after prep. | 30 min. | 60 min. | 90 min. | Air volume (%) Immediately after prep. | 90 min. | Compressive strength (N/mm$^2$) 3d | 7d | 28d |
|---|---|---|---|---|---|---|---|---|---|---|---|---|---|
| 1 | OPC1 | 2.0 | — | 0 | 17.3 | 12.6 | 10.7 | 8.2 | 4.1 | 3.0 | 22.5 | 33.5 | 42.8 |
| 4 | OPC1 | 2.0 | No. 1 | 25 | 20.5 | 14.5 | 13.5 | 12.5 | 5.0 | 3.5 | 20.1 | 32.0 | 41.5 |
| 13 | OPC1 | 2.0 | No. 6 | 25 | 19.3 | 13.2 | 12.5 | 10.8 | 4.7 | 3.2 | 20.9 | 32.8 | 42.5 |

*[1]wt. % with respect to cement
*[2]Parts by weight with respect to 100 parts by weight of clinker Test Example 2

Cement specimens were prepared by adding the cement admixtures produced in Example 3 to cement No. 1 listed in Table 4 of Example 2. The amounts of addition are indicated in Table 8. Similar to Test Example 1, the slump, air volume, and compressive strength of the concrete specimens were measured. The results are shown in Table 8.

TABLE 8

| No. | Burned product | SO$_3$*[1] | Added burned product*[2] | slump (cm) Immediately after prep. | 30 min. | 60 min. | 90 min. | Air volume (%) Immediately after prep. | 90 min. | Compressive strength (N/mm$^2$) 3d | 7d | 28d |
|---|---|---|---|---|---|---|---|---|---|---|---|---|
| 19 | No. 1 | 2.0 | 25 | 21.5 | 14.3 | 13.2 | 12.2 | 4.8 | 3.8 | 19.5 | 31.2 | 42.2 |
| 23 | No. 6 | 2.0 | 25 | 20.5 | 14.0 | 12.8 | 11.5 | 4.5 | 3.2 | 20.0 | 31.8 | 42.2 |

*[1]Parts by weight with respect to 100 parts by weight of burned product
*[2]Parts by weight with respect to 100 parts by weight of cement clinker

INDUSTRIAL APPLICABILITY

Through use of a cement admixture produced by grinding the burned product of the present invention, cement products exhibiting low heat of hydration and good fluidity can be obtained.

Moreover, the burned product of the present invention can be produced by making use of, as a raw material, industrial waste, non-industrial waste, or construction waste soil, and more advantageously can be produced exclusively from waste material, thereby enabling effective utilization of enormous volumes of waste. In addition, since the admixture of the invention can be produced through low-temperature burning of waste, fuel cost can be curtailed.

The invention claimed is:

1. A burned product containing 100 parts by weight of $C_2S$, 10 to 100 parts by weight of $C_2AS$, and 20 or less parts by weight of $C_3A$.

2. The burned product according to claim 1, wherein a portion of $C_2AS$ is replaced by $C_4AF$.

3. The burned product according to claim 1, which is produced from a raw material of one or more species selected from the group consisting of industrial waste, non-industrial waste, and construction waste soil.

4. The burned product according to claim 1, wherein burning is performed at 1,000 to 1,350° C.

5. A cement admixture prepared by grinding a burned product according to claim 1.

6. A cement admixture containing 100 parts by weight of a ground product of a burned product according to claim 1 and 1 to 6 parts by weight, as calculated on an $SO_3$ basis, of gypsum.

7. The burned product according to claim 1, wherein 70 wt. % of the $C_2AS$ is replaced by $C_4AF$.

8. The burned product according to claim 1, which is a sintered product.

9. The burned product according to claim 1, wherein the $C_2AS$ is present in an amount of from 20 to 90 parts by weight.

10. The burned product according to claim 1, wherein the $C_3A$ is present in an amount of 10 parts by weight or less.

11. The burned product according to claim 1, having a free lime content of 1% or less.

12. The burned product according to claim 1, which is obtained by burning a mixture comprising limestone, ready-mix cement sludge, sewage sludge and waste soil at a temperature of from 1,000 to 1,450° C.

13. The burned product according to claim 1, wherein the $C_2AS$ is present in an amount of from 20 to 90 parts by weight and the $C_3A$ is present in an amount of 10 parts by weight or less.

14. The burned product according to claim 1, which is obtained by burning at a temperature of from 1,200 to 1,330° C.

15. A cement which contains 100 parts by weight of ground portland cement clinker and 5 to 100 parts by weight of a ground product of a burned product according to claim 1.

16. A cement according to claim 15, which contains gypsum in an amount of 1.5 to 5 wt. % as calculated on an $SO_3$ basis.

17. The cement according to claim 15, wherein the gypsum is present in an amount of from 2 to 3.5 wt. % as calculated on an $SO_3$ basis.

18. The cement according to claim 15, wherein the gypsum is present in an amount of from 2.5 to 3 wt. % as calculated on an $SO_3$ basis.

19. A cured mortar obtained by drying the cement according to claim 15.

* * * * *